US012686496B2

(12) United States Patent 
Gurvich

(10) Patent No.: US 12,686,496 B2 
(45) Date of Patent: Jul. 21, 2026

(54) JOINT FOR COMPOSITE TUBULAR RODS

(71) Applicant: B/E Aerospace, Inc., Winston-Salem, NC (US)

(72) Inventor: Mark R. Gurvich, Middletown, CT (US)

(73) Assignee: B/E Aerospace, Inc., Winston-Salem, NC (US)

( * ) Notice: Subject to any disclaimer, the term of this patent is extended or adjusted under 35 U.S.C. 154(b) by 254 days.

(21) Appl. No.: 18/430,004

(22) Filed: Feb. 1, 2024

(65) Prior Publication Data

US 2025/0251003 A1 Aug. 7, 2025

(51) Int. Cl. 
*B64D 11/06* (2006.01) 
*B60N 2/68* (2006.01) 
(Continued)

(52) U.S. Cl. 
CPC .......... *B64D 11/0648* (2014.12); *B60N 2/682* (2013.01); *B64D 11/0696* (2013.01); 
(Continued)

(58) Field of Classification Search 
CPC ................ B60N 2/682; B64D 11/0648; B64D 11/0696; F16B 2/14; F16B 7/02; F16B 7/025; F16B 7/18; F16B 7/182; F16C 3/023; F16C 3/026; F16C 7/026; F16C 2226/16; Y10T 403/5793; Y10T 403/7051; Y10T 403/7052; Y10T 403/7054; Y10T 403/7056; Y10T 403/7058; Y10T 403/7067; Y10T 403/7069; Y10T 403/76 
(Continued)

(56) References Cited

U.S. PATENT DOCUMENTS

| 3,561,798 | A | * | 2/1971 | Redfern | .................. F16C 3/026 |
| | | | | | 403/370 |
| 4,319,076 | A | * | 3/1982 | Piur | ....................... H01B 17/32 |
| | | | | | 285/55 |

(Continued)

FOREIGN PATENT DOCUMENTS

| CN | 107044572 A | 8/2017 | |
| DE | 3408650 A1 * | 9/1985 | .............. F16C 7/026 |

(Continued)

OTHER PUBLICATIONS

European Patent Office, Extended European Search Report received in EP Application No. 25154170.2, Jun. 2, 2025, 7 pages.

*Primary Examiner* — Josh Skroupa 
(74) *Attorney, Agent, or Firm* — Sulter Swantz IP

(57) ABSTRACT

A joint assembly may include a first wedge ring, where the first wedge ring is arranged on an internal surface of the tubular composite rod, having a wedge-shaped radially outward geometry to form a wedge-shaped end portion. The joint assembly may include a second wedge ring, where the second wedge ring is arranged radially outward of an external surface of the tubular composite rod. The joint assembly may include a third wedge ring, where the third wedge ring is arranged between the second wedge ring and the tubular composite rod, where the third wedge ring is formed of two or more segments placed in a hoop direction. The first and the second wedge rings may be connected, for example, by thread joining.

18 Claims, 15 Drawing Sheets

(51) Int. Cl.
    *F16C 3/02*         (2006.01)
    *F16C 7/02*         (2006.01)
(52) U.S. Cl.
    CPC .............. *F16C 3/023* (2013.01); *F16C 3/026*
        (2013.01); *F16C 7/026* (2013.01); *F16C*
        *2226/16* (2013.01)

(58) Field of Classification Search
    USPC .... 403/314, 367, 368, 369, 370, 371, 374.3,
        403/374.4, 409.1
    See application file for complete search history.

(56)            References Cited

U.S. PATENT DOCUMENTS

| | | | | |
|---|---|---|---|---|
| 4,895,351 | A * | 1/1990 | Devaud | F16C 7/026 |
| | | | | 403/11 |
| 5,984,369 | A * | 11/1999 | Crook | F16B 7/025 |
| | | | | 285/915 |
| 7,192,213 | B2 * | 3/2007 | Mermoz | F16C 3/023 |
| | | | | 403/370 |
| 8,205,315 | B2 * | 6/2012 | Mullen | F16C 7/026 |
| | | | | 403/404 |
| 9,366,277 | B2 * | 6/2016 | Ingles | F16B 4/00 |
| 9,873,506 | B2 * | 1/2018 | Goldring | F16C 7/026 |
| 10,294,973 | B2 * | 5/2019 | Ganis | F16B 7/025 |
| 10,532,518 | B2 | 1/2020 | Gurvich et al. | |
| 10,539,174 | B2 | 1/2020 | Gurvich et al. | |
| 10,626,917 | B1 * | 4/2020 | Baird | F16C 7/026 |
| 10,781,839 | B2 | 9/2020 | Gurvich et al. | |
| 10,823,213 | B2 | 11/2020 | Gurvich et al. | |
| 10,927,883 | B2 | 2/2021 | Gurvich et al. | |
| 10,935,068 | B2 * | 3/2021 | Gurvich | F16C 3/026 |
| 11,041,585 | B2 * | 6/2021 | Gill | F16C 7/026 |
| 11,067,114 | B2 * | 7/2021 | Bernard | F16C 3/026 |
| 2021/0245864 | A1 | 8/2021 | Gurvich | |
| 2022/0243750 | A1 * | 8/2022 | Gurvich | B29C 65/64 |

FOREIGN PATENT DOCUMENTS

| | | | | | |
|---|---|---|---|---|---|
| DE | 4135695 | A1 * | 4/1993 | | F16C 7/026 |
| DE | 102016221978 | A1 * | 5/2018 | | F16C 3/023 |
| EP | 3611390 | B1 | 12/2020 | | |
| WO | WO-8303450 | A1 * | 10/1983 | | F16B 2/14 |

* cited by examiner

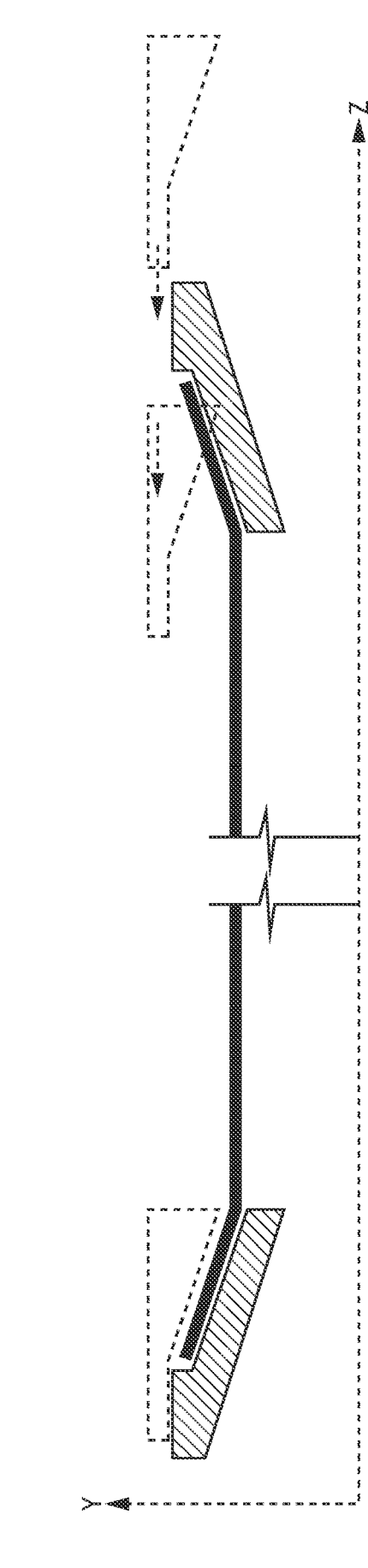
FIG.1C

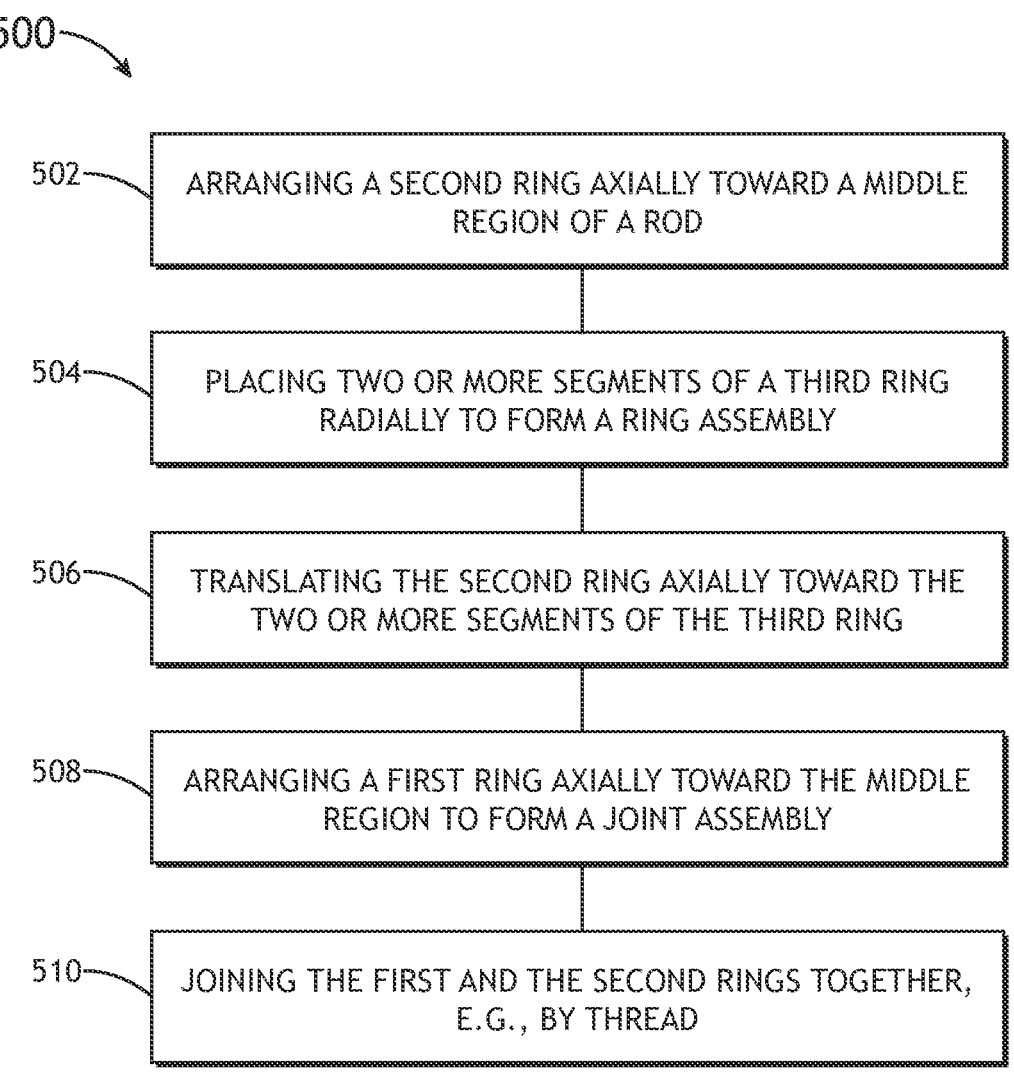

500

502 — ARRANGING A SECOND RING AXIALLY TOWARD A MIDDLE REGION OF A ROD

504 — PLACING TWO OR MORE SEGMENTS OF A THIRD RING RADIALLY TO FORM A RING ASSEMBLY

506 — TRANSLATING THE SECOND RING AXIALLY TOWARD THE TWO OR MORE SEGMENTS OF THE THIRD RING

508 — ARRANGING A FIRST RING AXIALLY TOWARD THE MIDDLE REGION TO FORM A JOINT ASSEMBLY

510 — JOINING THE FIRST AND THE SECOND RINGS TOGETHER, E.G., BY THREAD

FIG.5

JOINT FOR COMPOSITE TUBULAR RODS

TECHNICAL FIELD

The subject matter disclosed herein is related to the field of aircraft seats and, in particular, to a composite beam for an aircraft seat frame.

BACKGROUND

Composite seat structures provide exceptional opportunities for aircraft weight reduction in comparison with similar metallic applications. However, there are major challenges in joining elements of composite seat structures to provide reliable load transfer between such elements and/or other interior components.

SUMMARY

A joint assembly for a tubular composite rod is disclosed, in accordance with one or more embodiments of the present disclosure. In embodiments, the joint assembly includes a first wedge ring, where at least one end of the tubular composite rod has a wedge-shaped radially outward geometry to form a wedge-shaped end portion, where the first wedge ring is arranged on an internal surface of the tubular composite rod at the wedge-shaped end portion of the tubular composite rod. In embodiments, the joint assembly includes a second wedge ring, where the second wedge ring is arranged radially outward of an external surface of the tubular composite rod at the wedge-shaped end portion of the tubular composite rod. In embodiments, the joint assembly includes a third wedge ring, where the third wedge ring is arranged between the second wedge ring and the external surface of the tubular composite rod at the wedge-shaped end portion of the tubular composite rod, where the third wedge ring is formed of two or more segments placed in a hoop direction.

In some embodiments, the second wedge ring and the first wedge ring may be connected outside of the wedge-shaped end portion of the tubular composite rod.

In some embodiments, the connection may be implemented by at least one of a thread, one or more fasteners, an adhesion, or a combination thereof.

In some embodiments, a cross-section of the tubular composite rod may be at least one of circular, quadratic, rectangular, or polygonal.

In some embodiments, the third wedge ring may be formed of two segments.

In some embodiments, the third wedge ring may be formed of three segments.

In some embodiments, the first wedge ring may have a slope α in an axial cross-section at the external surface of the first wedge ring and the third wedge ring may have a slope β in an axial cross-section at the external surface of the third wedge ring.

In some embodiments, the slope α may greater than the slope β.

In some embodiments, the slope α may smaller than the slope β.

In some embodiments, one of the first wedge ring, the second wedge ring or the third wedge ring may be formed of at least one of a metal or a metal alloy.

In some embodiments, the tubular composite rod may be formed as fiber-reinforced composite embedded in a matrix.

In some embodiments, a fiber of the fiber-reinforced composite may include at least one of carbon, glass, organic, or boron fibers, where the matrix may be at least one of a thermoset polymer or a thermoplastic polymer.

An aircraft seat is disclosed, in accordance with one or more embodiments of the present disclosure. In embodiments, the aircraft seat includes a seatback. In embodiments, the aircraft seat includes a seat pan. In embodiments, the aircraft seat includes a base assembly couplable to a floor of an aircraft cabin via one or more floor fittings. In embodiments, the base assembly includes one or more tubular composite rods, where at least one end of the tubular composite rod has a wedge-shaped radially outward geometry to form a wedge-shaped end portion. In embodiments, each tubular composite rod of the one or more tubular composite rods include one or more joint assemblies. In embodiments, each joint assembly includes a first wedge ring, where at least one end of the tubular composite rod has a wedge-shaped radially outward geometry to form a wedge-shaped end portion, where the first wedge ring is arranged on an internal surface of the tubular composite rod at the wedge-shaped end portion of the tubular composite rod. In embodiments, each joint assembly includes a second wedge ring, where the second wedge ring is arranged radially outward of an external surface of the tubular composite rod at the wedge-shaped end portion of the tubular composite rod. In embodiments, each joint assembly includes a third wedge ring, where the third wedge ring is arranged between the second wedge ring and the external surface of the tubular composite rod at the wedge-shaped end portion of the tubular composite rod, where the third wedge ring is formed of two or more segments placed in a hoop direction.

In some embodiments, the second wedge ring and the first wedge ring may be connected outside of the wedge-shaped end portion of the tubular composite rod.

In some embodiments, the third wedge ring may be formed of two segments.

In some embodiments, the third wedge ring may be formed of three segments.

In some embodiments, the first wedge ring may have a slope α in an axial cross-section at the external surface of the first wedge ring and the third wedge ring may have a slope β in an axial cross-section at the external surface of the third wedge ring.

In some embodiments, one of the first wedge ring, the second wedge ring or the third wedge ring may be formed of at least one of a metal or a metal alloy.

In some embodiments, the one or more tubular composite rods may be formed as a fiber-reinforced composite embedded in a matrix, where a fiber of the fiber-reinforced composite may include at least one of carbon, glass, organic fibers, or boron fibers, where the matrix may include at least one of a thermoset polymer or a thermoplastic polymer.

A method of manufacturing a joint assembly for a tubular composite rod is disclosed, in accordance with one or more embodiments of the present disclosure. In embodiments, the method includes positioning a second wedge ring axially toward a middle region of the tubular composite rod, where at least one end of the tubular composite rod has a wedge-shaped radially outward geometry to form a wedge-shaped end portion. In embodiments, the method includes positioning two or more segments of a third wedge ring radially to form a ring assembly in the wedge-shaped end portion of the tubular composite rod. In embodiments, the method includes translating the second wedge ring axially toward the two or more segments of the third wedge ring in the wedge-shaped end portion of the tubular composite rod. In embodiments, the method includes positioning a first ring axially toward an internal surface of the tubular composite rod in the wedge-shaped end portion of the tubular composite rod. In embodiments, the method includes assembling the joint assembly by connecting the first wedge ring and the second wedge ring.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1C is a simplified axial cross-sectional view of joint areas for the tubular composite rod, illustrating challenges of installation (i.e., axial movement) of external wedge-shaped rings if both ends of the rod have radially outward wedge-shaped geometries.

FIG. 5 is a flowchart depicting a method or process for making a joint area assembly of the present disclosure, in accordance with one or more embodiments of the present disclosure.

DETAILED DESCRIPTION OF THE INVENTION

Figure 1A:
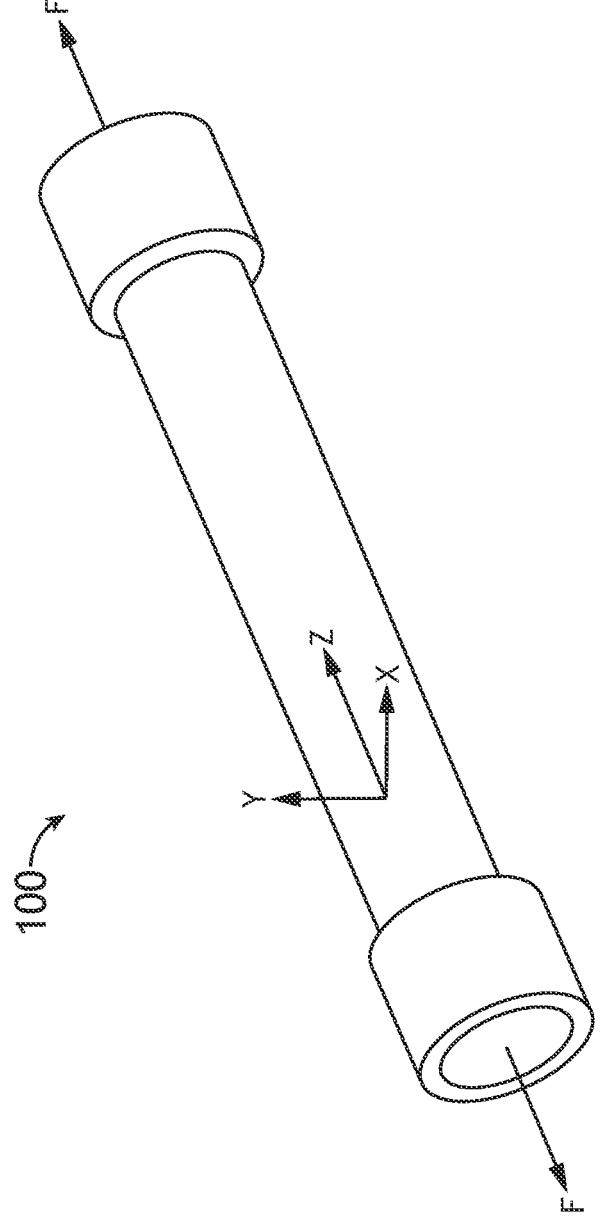
FIG. 1A is a simplified schematic perspective view of a tubular composite rod under representative load of axial tension.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Seats may include components such as, but not limited to, a seatback, a seat pan, and a base assembly (e.g., a primary structure). In select industries the build of the seat (and any included components within the build) may be required to meet guidelines and/or standards. For example, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), or any other standards setting organization or company; or any other guidelines agency or organization; or the like. The base assembly may present difficulties such as, but not limited to, failing to meet load requirements (e.g., abuse, reliability, and dynamic load requirements (e.g., 4G lateral and 16g FWD load requirements)), or the like as set forth by the FAA in 14 C.F.R. Part 25, Airworthiness Standards: Transport Category Airplanes)).

Figure 4:
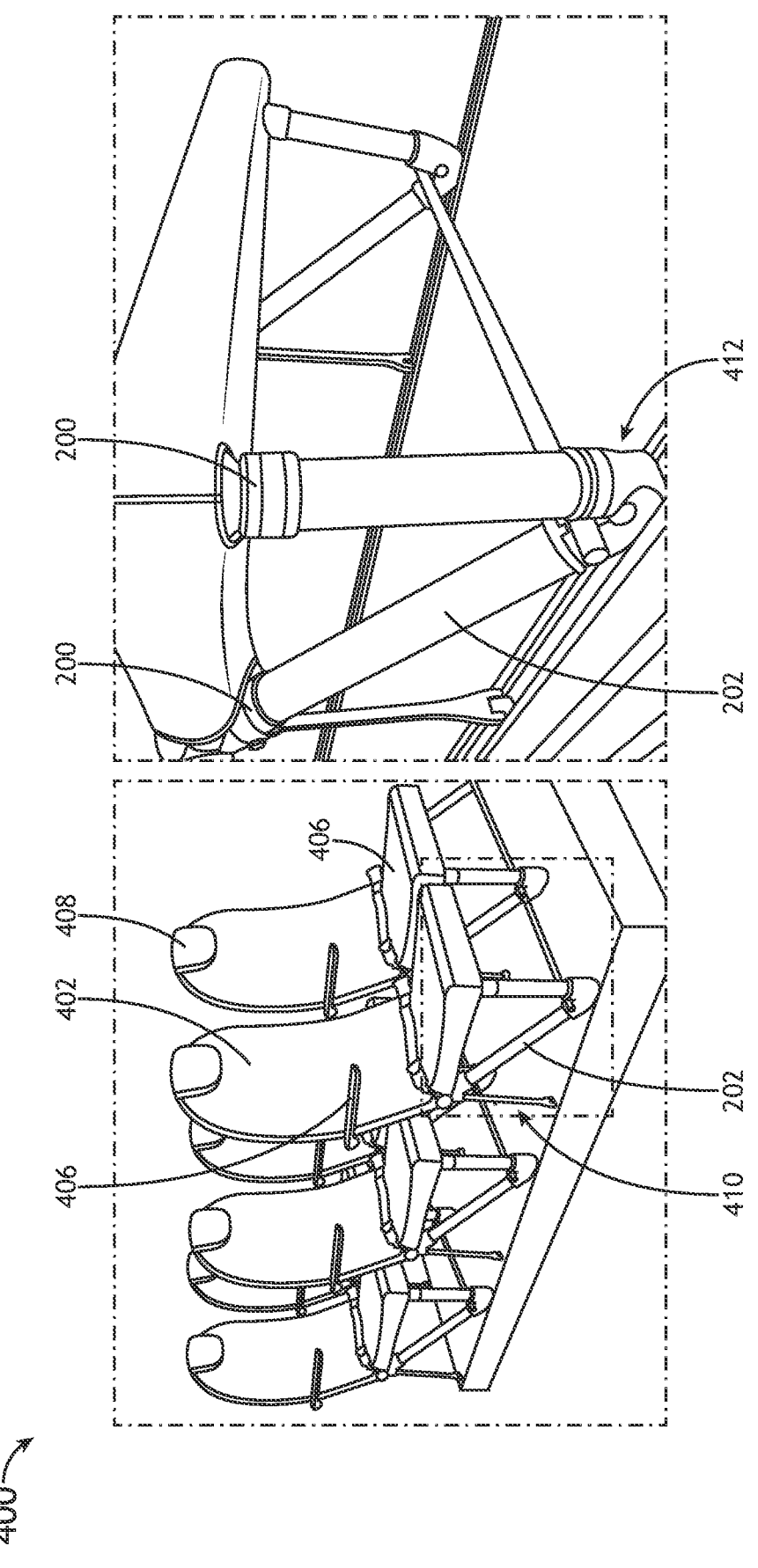
FIG. 4 is a simplified schematic view of a group of aircraft seats including a seat frame with the tubular composite rod and the joint assembly, in accordance with one or more embodiments of the present disclosure.

Metals and alloys (e.g., aluminum and mild steel) are conventionally used in the build of aircraft seats and deliver specified stiffness, strength and ductility, however, metals and alloys usually increase weight of the aircraft seat, making their weight reduction one of prime objectives for seat optimization. Composite seat structures, such as based on frames consisting of composite rod elements (e.g., as shown in FIG. 4), provide exceptional opportunities for weight reduction in comparison with metallic frames. However, there are major challenges in joining such composite rod elements to provide reliable load transfer and connections. Composite tubular hollow rod elements with circular ring-type cross-section provide both structural efficiency and convenience for their fabrication and are considered further in this disclosure.

For example, as shown in FIG. 1A, to use composite cylindrical rods as a structural primary element for reliable load transfer, e.g., under axial tension, corresponding end joints are needed for connections with external structures or/and other composite rod elements. An example shown in FIG. 1A illustrates a case of uniaxial tension, however joints may be similarly needed in load cases of axial compression, bending, torsion or any of their combinations.

Fastener-base joints are often used for such purposes, when the fasteners applied in the radial through-thickness direction to connect walls of composite tubular rods with inserted sleaves of metallic joints. However, such joints may generate additional structural risks due to through-thickness damage of composite rod walls, exposing composites to relatively weak interlaminar and/or transversal strength of individual layers. Further, such joints may be also cost- and labor-consuming and require high thresholds of quality requirements.

On the other hand, adhesion-based joints are sensitive to temperature, moisture, aging, and overall potential degradation. Application of adhesion-based joints as primary structural elements is also limited by aircraft safety regulations, in accordance with aviation guidelines and/or standards.

Figure 1B:
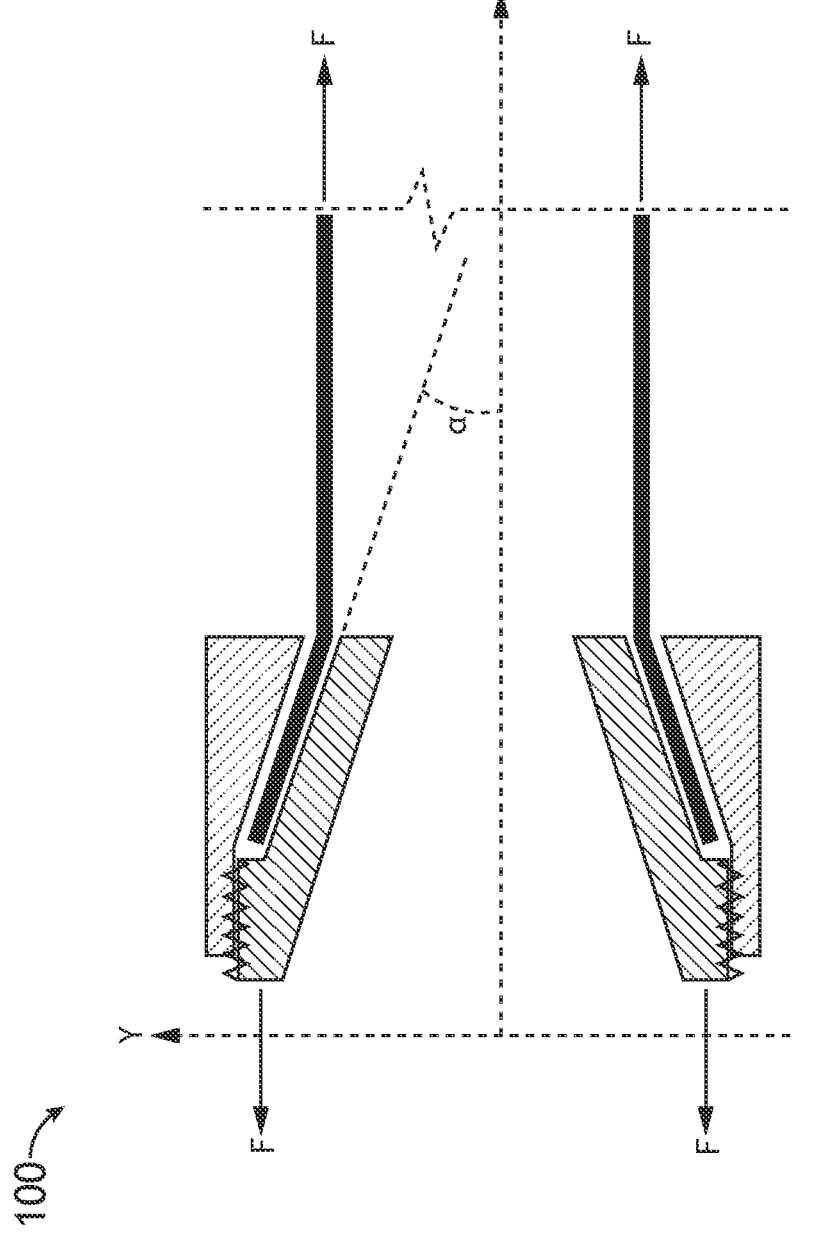
FIG. 1B is a simplified axial cross-sectional view of a joint area for the tubular composite rod.

Wedge-based joints, as shown in FIG. 1B, provide efficient solutions for load transfer without the disadvantages mentioned above with respect to fastener-based joints or adhesion-based joints. Load transfer in wedge-based joints is based on internal load reactions between connected parts due to non-zero angle $\alpha$ with respect to axial orientation z (as shown in FIG. 1B). It provides an opportunity in principle to transfer axial load F even without friction between connected parts of the joint assembly and without adhesion (as in adhesion-based joints) or without cutting or drilling through walls of composite rods (as in fastener-based joints).

However, the major challenge of the wedge-based joints may be installation at both ends of the composite rod. For example, as shown in FIG. 1C, installation of axisymmetric external rings by axial movement is impossible, if both ends of the composite rod have the same radially expanding wedge geometry. Due to this challenge, many of existing joining solutions ignore opportunities of wedge-based designs or have different joint designs at opposite ends of the rods. As such, it would be desirable to provide configurations of joints having both benefits of wedge-based load transfer (as shown in FIG. 1B) but, at the same time, without disadvantages of installation challenges (as shown in FIG. 1C).

The wedge-based joint should allow axisymmetric external rings to be installed at both ends of the composite rod. The wedge-based joint should be configured in accordance with aviation guidelines and/or standards. For example, the aircraft seat, including the wedge-based joint, should meet load requirements (e.g., abuse, reliability, and dynamic load requirements). Further, the aircraft seat, including the wedge-based joint, should reduce fabrication time, improve installation, and reduce the cost and weight of the seat.

FIGS. 2A-7 in general illustrate a proposed joint area assembly 200 for a tubular composite rod 202 and a method of making, in accordance with one or more embodiments of the disclosure.

Figure 2A:
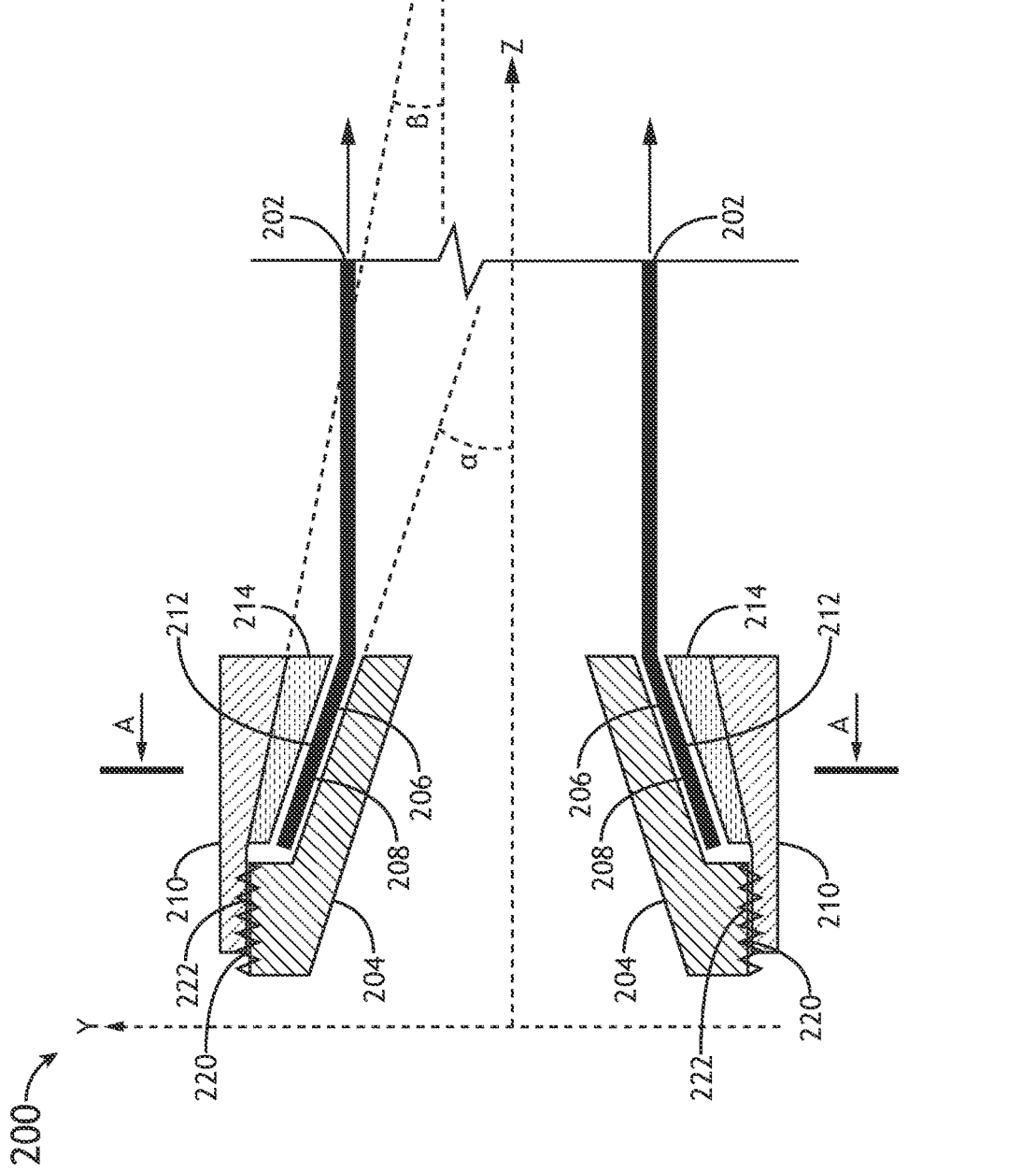
FIG. 2A is a simplified axial cross-sectional view of a joint area assembly for a tubular composite rod, in accordance with one or more embodiments of the present disclosure.
Figure 2B:
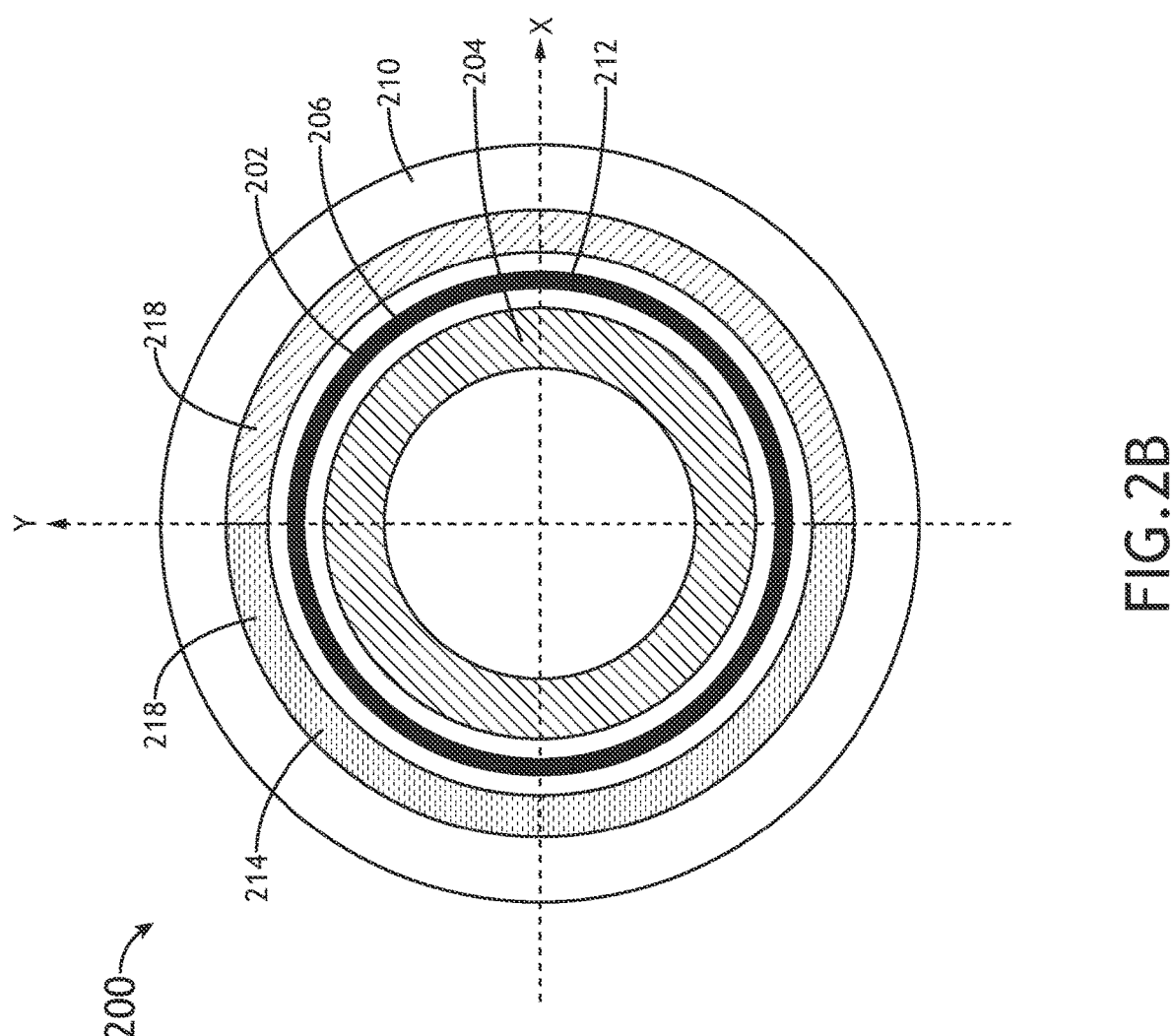
FIG. 2B is a simplified diametric cross-sectional view of a joint area assembly for a tubular composite rod, in accordance with one or more embodiments of the present disclosure.
Figure 2C:
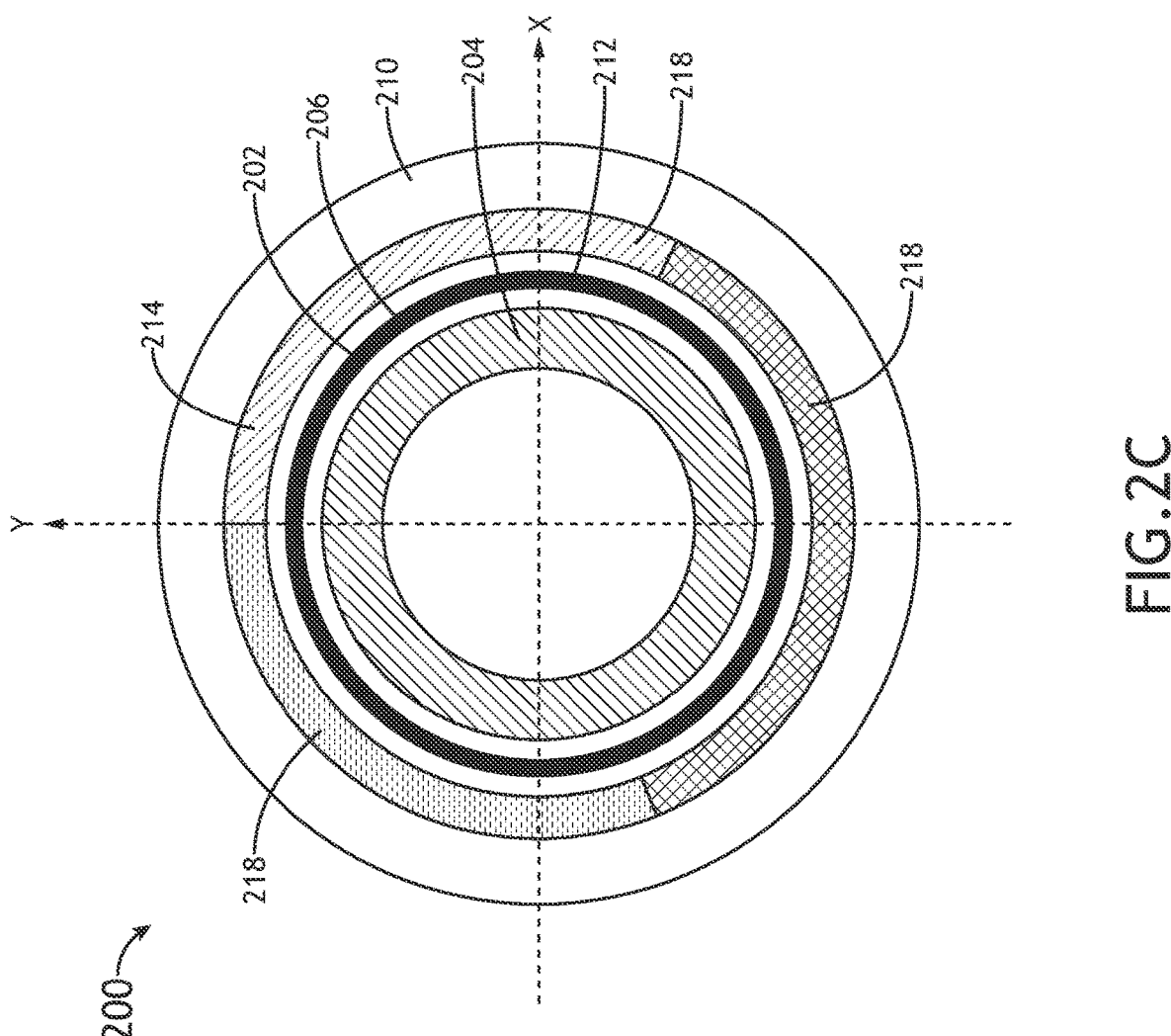
FIG. 2C is a simplified diametric cross-sectional view of a joint area assembly for a tubular composite rod, in accordance with one or more embodiments of the present disclosure.
Figure 2D:
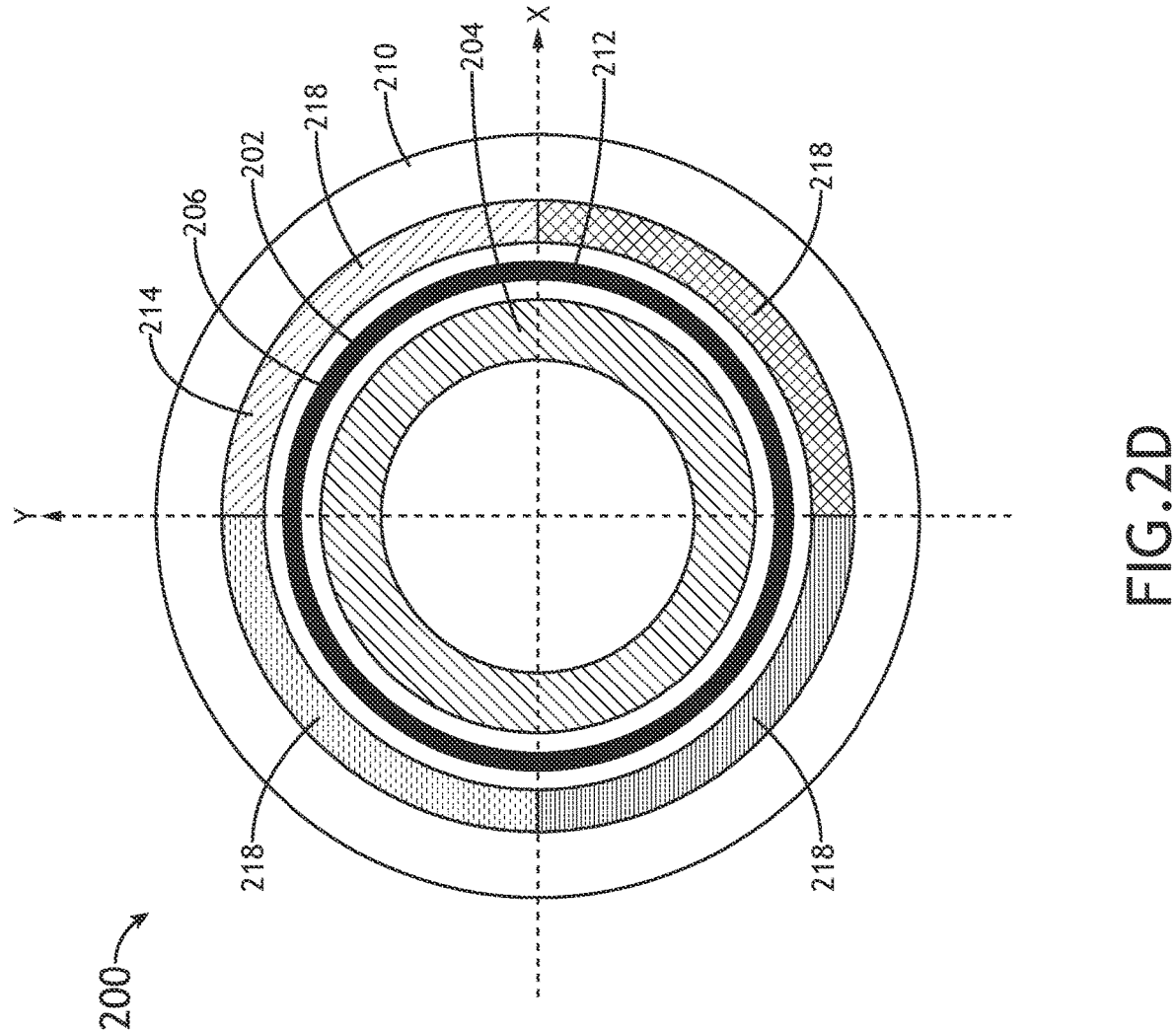
FIG. 2D is a simplified diametric cross-sectional view of a joint area assembly for a tubular composite rod, in accordance with one or more embodiments of the present disclosure.
Figure 2E:
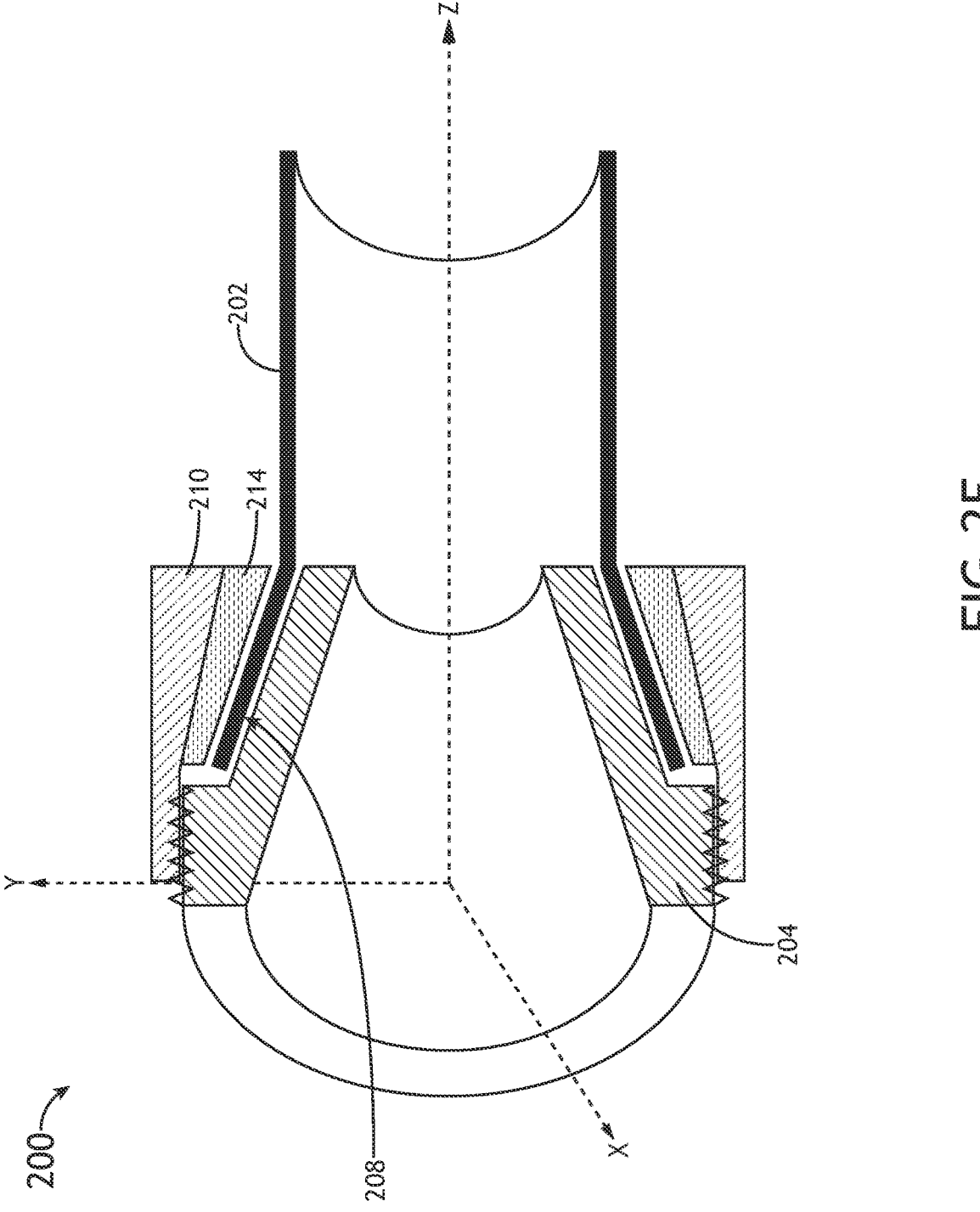
FIG. 2E is a simplified perspective view of a half of joint area assembly for a tubular composite rod, in accordance with one or more embodiments of the present disclosure.

FIGS. 2A-2E illustrate the joint area assembly 200 for the tubular composite rod 202, in accordance with one or more embodiments of the present disclosure. In particular, FIG. 2A is an axial cross-section, and FIGS. 2B-2D are diametric cross-sections A-A, as specified in FIG. 2A.

The joint assembly 200 may include a first wedge ring 204. For example, the first wedge ring 204 may be approximately conical (i.e., axisymmetric with a wedge shape in its axial cross-section) with a slope $\alpha$ at its external surface. The slope $\alpha$ should be a non-zero angle used to generate corresponding normal reactions to resist axial loads.

The tubular composite rod 202 may have at least a first end and a second end. At least one of the first end or the second end may have a wedge-shaped end portion 208. For example, the wedge-shaped end portion 208 may have a wedge-shaped radially outward geometry. The cross-section of the tubular composite rod 202 may be at least one of circular, quadratic, rectangular, polygonal, or any other convex closed loop shape.

It is contemplated herein that the tubular rod 202 may be formed of any suitable material such as, but not limited to, a fiber-reinforced composite embedded in a matrix. For example, the fibers of the fiber-reinforced composite may include, but is not limited to, glass fibers, carbon fibers, organic or boron fibers. The fibers may be continuous or discontinuous, and may be placed in different orientations through, for example, individual uni-directionally reinforced plies, organized in a laminated layup. Orientations of individual plies and their mutual arrangement in the laminated layup may be optimized according to specifics of load conditions and service requirements. Further, the matrix may include but not limited to, a thermoset polymer or a thermoplastic polymer, or the like.

In other embodiments, tubular rod element 202 may be made of a polymer or a polymeric blend, reinforced with randomly distributed short segments of fibers. In yet other embodiments, tubular rod element may be a polymer (or polymer blend) without any fiber reinforcement (in such cases, the polymer has to satisfy desired stiffness and strength requirements).

It is noted herein that tubular composite rods 202 may be made using any appropriate manufacturing methods. For example, Automated Fiber Placement (AFP) or filament-winding or braiding manufacturing methods may be applied for fabrication of fiber-reinforced composite rod 202.

The first wedge ring 204 may be arranged on an internal surface 206 of the tubular composite rod 202 at the wedge-shaped end portion 208 of the 202. For example, the slope α may be the same as a slope of the end 208, such that the contact region between the first wedge ring 204 and the wedge-shaped end portion 208 is compatible.

The joint assembly 200 may include a second wedge ring 210. The second wedge ring 210 may also have a wedge shape. For example, the second wedge ring 210 may be arranged radially outward of an external surface 212 of the wedge-shaped end portion 208 of the tubular composite rod 202. The internal surface of the second wedge ring 210 should have non-zero slope with respect to axial orientation z.

The joint assembly 200 may include a third wedge ring 214. For example, the third wedge ring 214 may be with a wedge shape, where its external surface has slope β, and its internal surface has slope α. In some instances, the wedge slopes α, β are the same. In other instances, the wedge slopes α, β are different. For example, the slope α may be greater than the slope β. By way of another example, the slope α may be less than the slope β.

The third wedge ring 214 may be arranged between the second wedge ring and an external surface 212 of the tubular composite rod 202 of the wedge-shaped end portion 208.

The third wedge ring 214 may be formed by two or more segments 218. For example, as shown in FIG. 2B, the third wedge ring 214 may be formed by two segments 218. By way of another example, as shown in FIG. 2C, the third wedge ring 214 may be formed by three segments 218. By way of another example, as shown in FIG. 2D, the third wedge ring 214 may be formed by four segments 218. Although FIGS. 2A-2D depict a specific segment configuration, it is noted herein that the joint assembly 200 may include any number and configuration of segments for the third wedge ring 214. It is contemplated herein that individual segments 218 may be the same or different. Further, it is contemplated, in some embodiments, a set of individual segments 218 may cover the entire perimeter of the rod surface 212 in the hoop orientation (i.e., totaling 360 deg) or may cover it partially, i.e., with some gaps in the hoop orientation between segments 218.

Referring to FIG. 2A, the first wedge ring 204 and the second wedge ring 210 may be coupled together at one or more connection points 220. For example, each ring 204, 210 may include a threaded portion 222 at the connection point 220, where the threaded portion 222 of the respective ring is complementary to the other ring.

It is contemplated herein that the one or more components of the joint assembly 200 may be formed of any suitable material such as, but not limited to, one or more metals, one or more alloys, ceramic, stone, wood, non-composite material, non-polymer material, or the like.

Figure 3A:
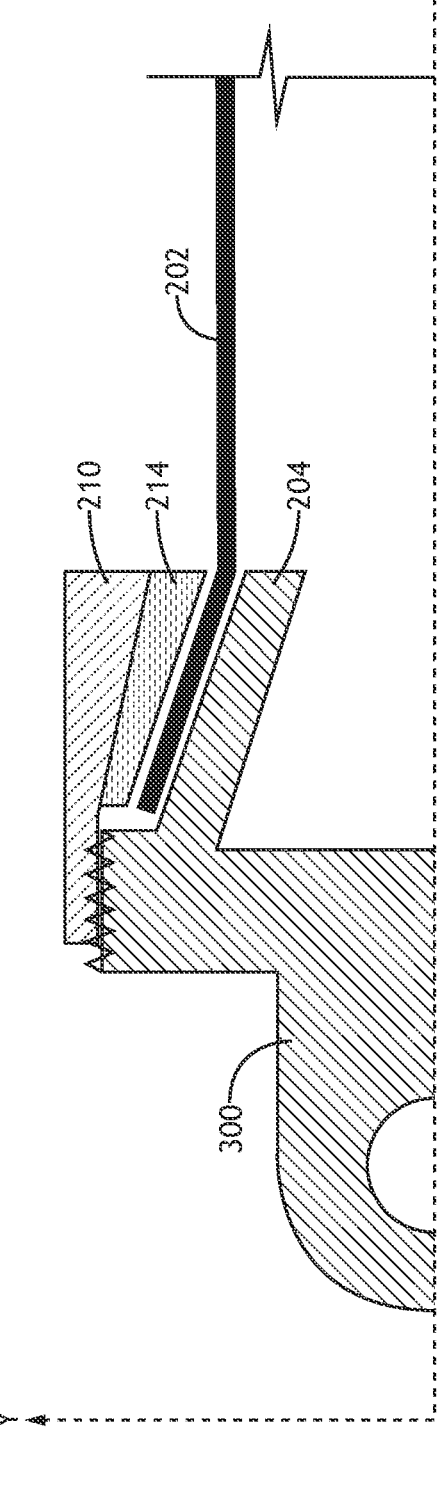
FIG. 3A is a simplified axial cross-sectional view of a joint area assembly for a tubular composite rod including a lug for connection and load transfer with outside structures, in accordance with one or more embodiments of the present disclosure.
Figure 3B:
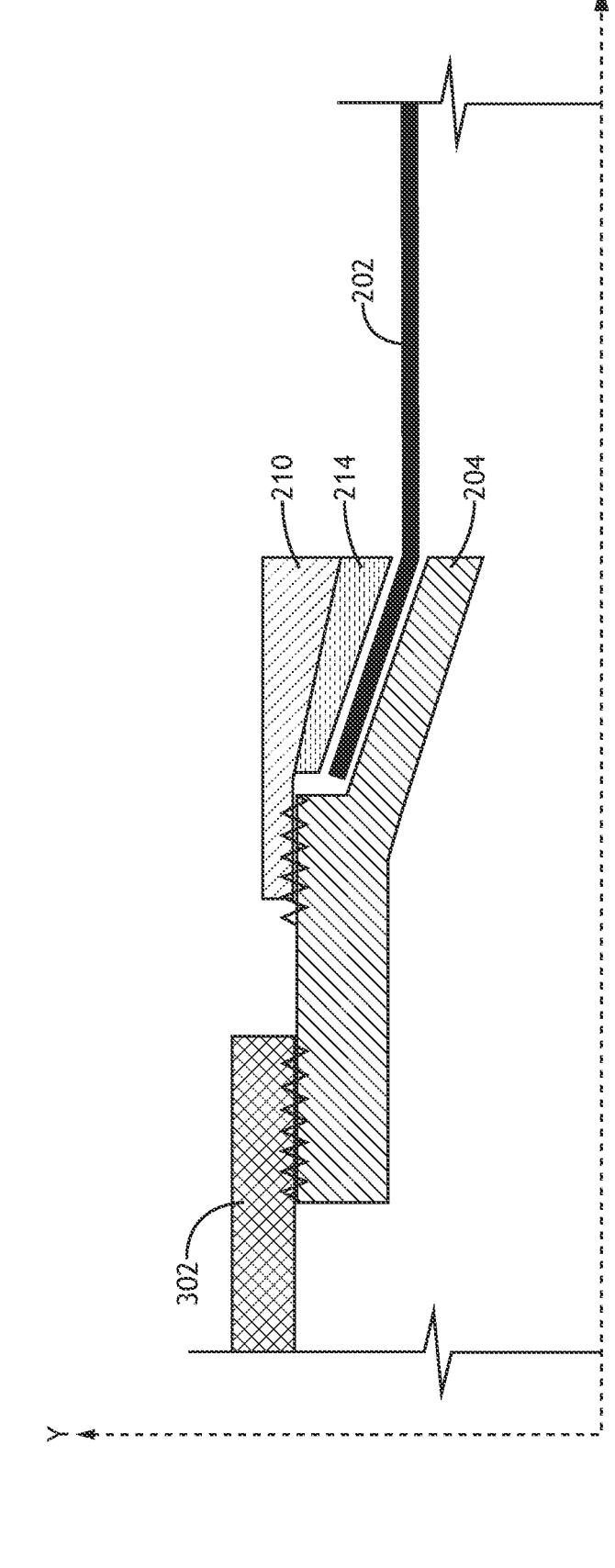
FIG. 3B is a simplified axial cross-sectional view of a joint assembly for a tubular composite rod including a thread for connection and load transfer with outside structures, in accordance with one or more embodiments of the present disclosure.
Figure 3C:
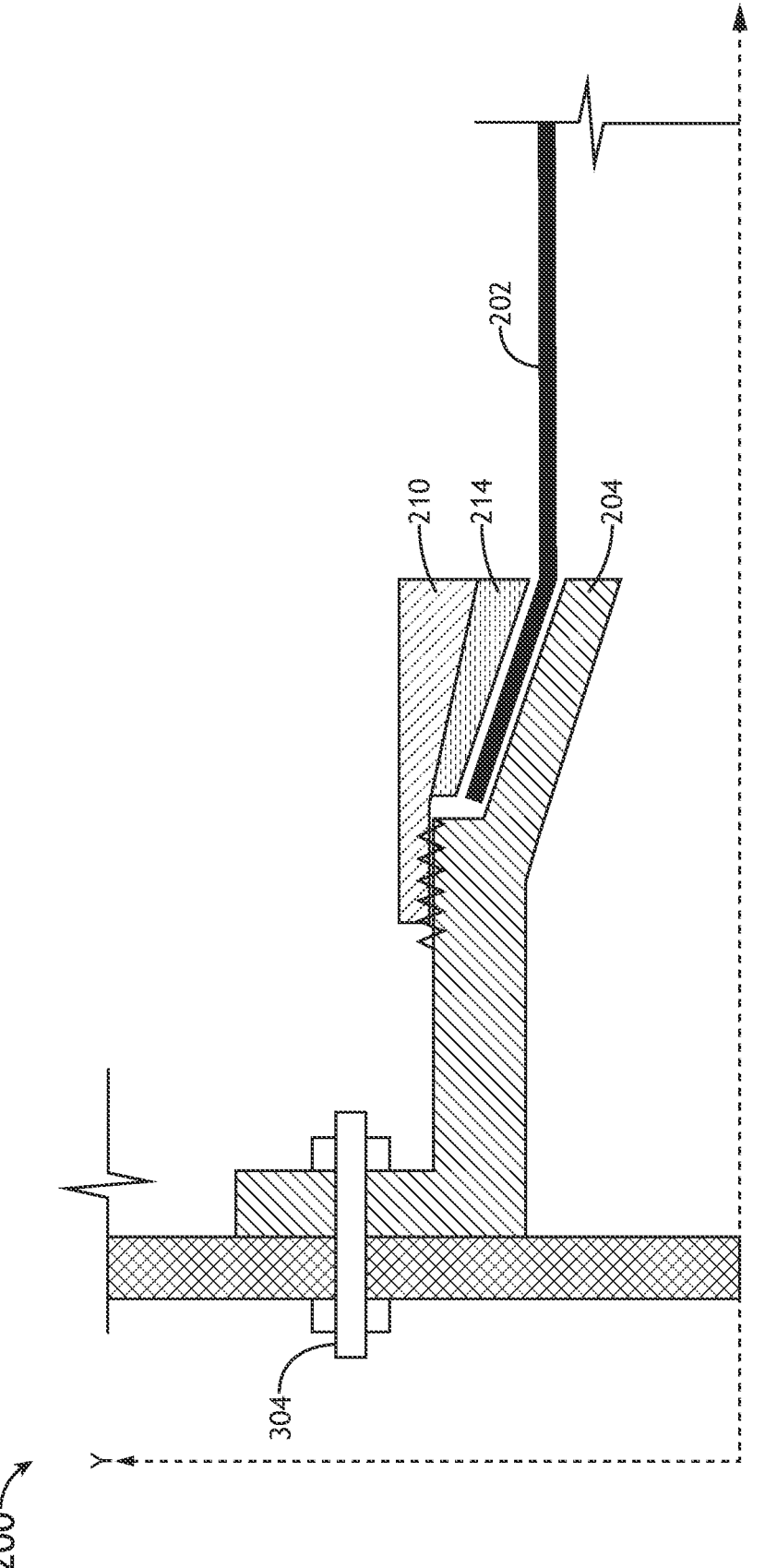
FIG. 3C is a simplified axial cross-sectional view of a joint assembly for a tubular composite rod including a fastener for connection and load transfer with outside structures, in accordance with one or more embodiments of the present disclosure.

FIG. 3A-3C are simplified axial cross-sectional views of a joint area assembly for a tubular composite rod including different variants of connectors with other rods or external structures, in accordance with one or more embodiments of the present disclosure.

In some embodiments, one of the first ring 204 or the second ring 210 are coupled with a connector of different designs. For example, as shown in FIG. 3A, the connector may include a lug 300. For instance, the lug 300 may be coupled to the first ring 204. By way of another example, as shown in FIG. 3B, the connector may include a thread joining 302. For instance, the threaded joining 302 may be coupled to the first ring 204. By way of another example, as shown in FIG. 3C, the connector may include a bolted fastener 304. For instance, the bolted fastener 304 may be coupled to the first ring 204.

FIG. 4 is a simplified schematic of an example of aircraft seat 400 including the tubular composite rod 202 and the joint assembly 200, in accordance with one or more embodiments of the present disclosure.

The joint assembly 200 and tubular composite rod 202 together may be integrated within an aircraft seat 400 installed within an aircraft cabin. For example, they may be integrated within a row of aircraft seats 400 installed within an aircraft cabin. By way of another example, they may be integrated within an individual aircraft seat 400 installed within an aircraft cabin. It is noted that FIG. 4 is provided merely for illustrative purposes and shall not be construed as limiting the scope of the present disclosure.

The aircraft seat 400 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

The aircraft seat 400 may be rotatable about an axis (e.g., swivelable). The aircraft seat 400 may be fully positionable between the outer limits of motion as defined by the moveable components of the aircraft seat 400. Where the aircraft seat 400 is installed within a passenger compartment, the aircraft seat 400 may be fully positionable between the outer limits of motion as defined by one or more passenger compartment monuments of the passenger compartment. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 400 may be actuatable (e.g., translatable and/or rotatable) from the TTL position to a non-TTL position, and/or vice versa. Further, it is noted the aircraft seat 400 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 400 may be translatable (e.g., trackable or slidable). The aircraft seat 400 may be rotatable about an axis cross-wise through the aircraft seat 400 into a position including, but not limited to, the upright or raised position, one or more lounge or reclined positions, and a lie-flat or bed position. For example, the aircraft seat 400 may transition directly between the upright or raised position and the lie-flat or bed position. By way of another example, it is noted the aircraft seat 400 may transition through one or more lounge or reclined positions between the upright or raised position and the lie-flat or bed position. By way of another example, the aircraft seat 400 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 400 may include a seatback 402. The aircraft seat 400 may include a seat pan 404. The aircraft seat 400 may include one or more arms 406.

The seatback 402 may include a headrest 408. For example, the headrest 408 may be integrated within the seatback 402. By way of another example, the headrest 408 may be a separate component coupled to (or inserted into) the seatback 402. For instance, the headrest 408 may be movable relative to the seatback frame of the aircraft seat 400 (e.g., adjustable, removable, or the like).

The aircraft seat 400 may be coupled to a base assembly 410. For example, the seat frame of the aircraft seat 400 may be couplable to the base assembly 410. The base assembly 410 may be couplable to a floor of an aircraft cabin. For example, the base assembly 410 may be couplable to a floor of an aircraft cabin via one or more tracks (not shown), one or more track covers, and/or one or more floor fittings (or track fasteners).

The base assembly 410 may include one or more leg sub-assemblies 412. Each leg sub-assembly 412 may include one or more legs. The one or more legs 412 may include the one or more tubular composite rods 202, where the respective rods 202 are coupled together via the joint assemblies 200. The one or more legs may be couplable to one or more portions of the seat frame of the aircraft seat 400.

FIG. 5 is a flowchart depicting a method or process 500 for making a joint area assembly of the present disclosure, in accordance with one or more embodiments of the present disclosure. FIGS. 6A-6D are simplified schematic views depicting the method or process 500 for making joint area assembly of the present disclosure, in accordance with one or more embodiments of the present disclosure. FIG. 7 is a simplified schematic depicting the method or process 500 for making joint area assembly of the present disclosure, in accordance with one or more embodiments of the present disclosure.

Figures 6A, 6B, 6C, 6D:
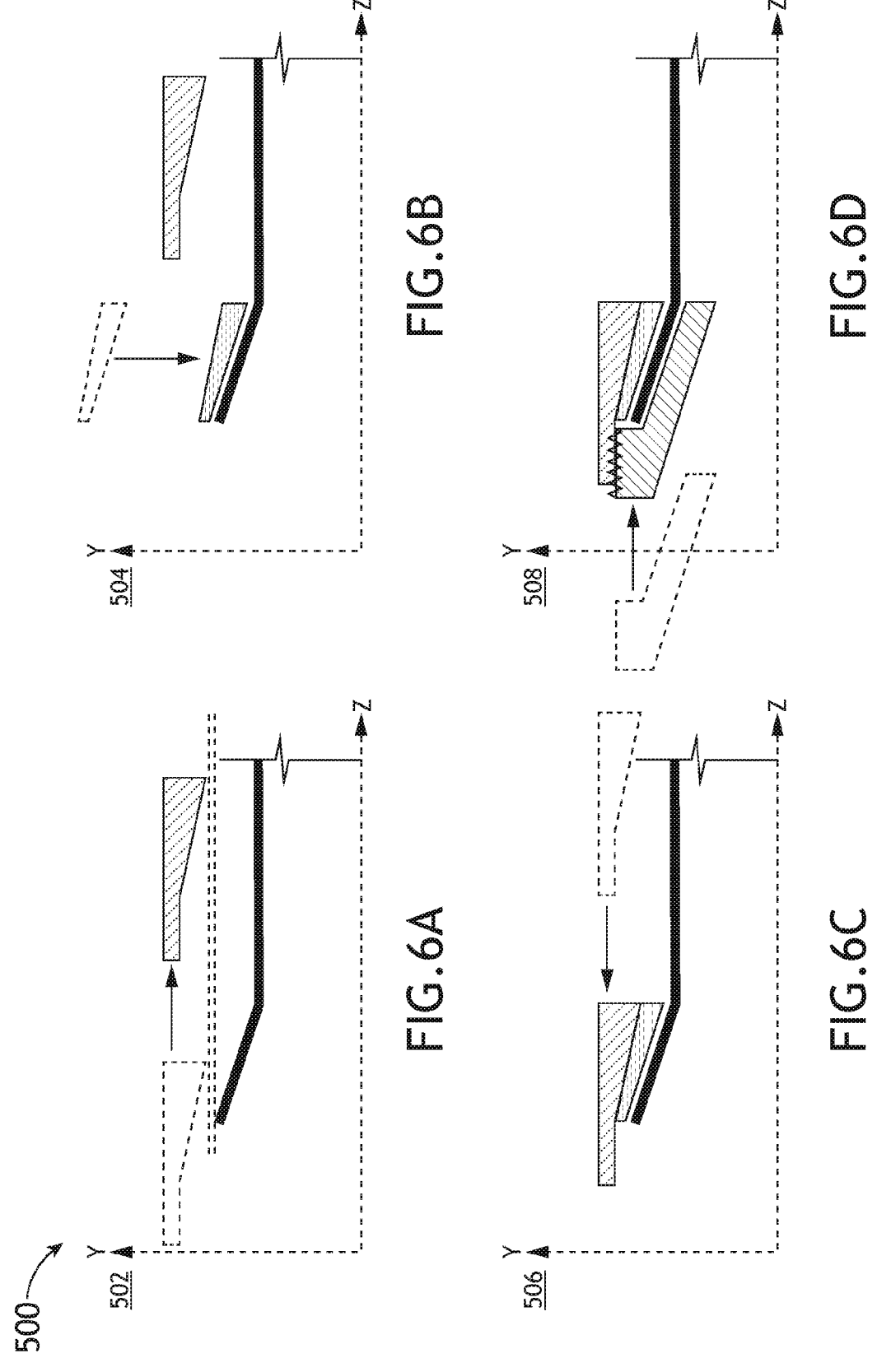
FIGS. 6A-6D are simplified schematic axial axisymmetric views depicting the method or process for manufacturing joint assembly of the present disclosure, in accordance with one or more embodiments of the present disclosure.
Figure 7:
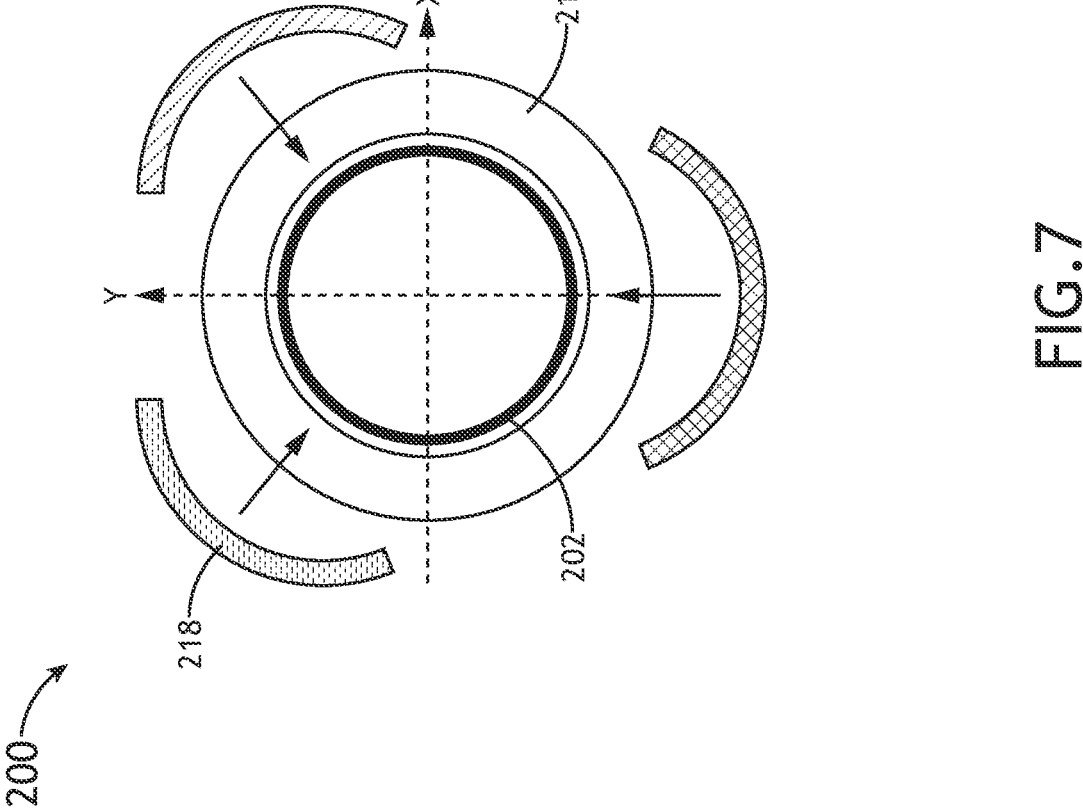
FIG. 7 is a simplified schematic depicting the method or process for manufacturing joint assembly of the present disclosure, in accordance with one or more embodiments of the present disclosure.

In a step 502, the second ring 210 may be arranged axially toward a middle region of the tubular composite rod 202, as shown in FIG. 6A.

In a step 504, the two or more segments of the third ring 214 may be arranged radially to form a third ring assembly, as shown in FIG. 6B. For example, as shown in FIG. 7, each segment 218 may be placed in a radial direction to create a 360-degree ring assembly. For instance, as shown in FIG. 7, three segments 218 may be placed in the radial direction to create the 360-degree joint assembly 200.

As previously discussed herein, it is contemplated herein that the two or more segments 218 of the third ring 214 may allow for easy installation in the radial direction, eliminating the key challenge of direct axial installation of the external metallic ring (as shown in FIG. 1C). Further, the joint area assembly 200 is able to achieve the advantages of the wedge-based load transfer, as previously discussed herein. In particular, the non-zero slope α is used to generate corresponding normal reactions to resist axial loads, where the wedge-based design allows reliable load transfer.

In a step 506, the second ring 210 may be translated axially toward the third ring 214. For example, as shown in FIG. 6C, the second ring 210 (previously in a middle region) may be translated axially toward the third ring 214 to lock together the segments 218 of the third ring 214. In some embodiments, the third ring 214 and the second ring 210 are locked together via a compression axial force. In some embodiment, the third ring 214 or/and the second ring 210 may be additionally locked together with wedge-shaped portion 208 of rod 202 using, for example, an adhesive, or the like.

In a step 508, the first ring 204 may be arranged axially toward the middle region of the tubular composite rod 202. For example, as shown in FIG. 6D, the first ring 204 may be moved toward the middle region of the composite rod 202, such that the first ring 204 is in contact with the second ring 210. Finally, in some embodiments, as a step 510, the first ring 204 may be coupled to the second ring 210 via different typical joining solutions, e.g., via one or more threaded portions 222 at one or more connection locations 220.

Although the above discussion contemplates the joint assembly 200 being implemented in an aviation environment, it is noted herein that the joint assembly 200 may be implemented in any environment or a number of conditions. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business). Further, it is noted herein that the joint assembly 200 may be used in conjunction with other aircraft monuments besides aircraft seats such as, but not limited to, actuators, linkages, interior monuments, fuselage frame, aircraft wings, or the like.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A joint assembly in combination with a tubular composite rod, the joint assembly comprising:

a first wedge ring, wherein at least one end of the tubular composite rod has a wedge-shaped radially outward geometry to form a wedge-shaped end portion, wherein the first wedge ring is arranged on an internal surface of the tubular composite rod at the wedge-shaped end portion of the tubular composite rod, wherein the first wedge ring is conical and asymmetric in an axial cross-section with the wedge-shaped end portion, wherein the first wedge ring includes a first end and a second end, wherein the first end of the first wedge ring has a first diameter and the second end of the first wedge ring has a second diameter, wherein the first diameter is greater than the second diameter, wherein a slope of the first wedge ring is complementary to a rod slope of the tubular composite rod;

a second wedge ring, wherein the second wedge ring is arranged radially outward of an external surface of the tubular composite rod at the wedge-shaped end portion of the tubular composite rod; and a third wedge ring, wherein the third wedge ring is arranged between the second wedge ring and the external surface of the tubular composite rod at the wedge-shaped end portion of the tubular composite rod, wherein the third wedge ring is formed of two or more segments placed in a hoop direction, wherein the second wedge ring includes a first end and a second end, wherein the first end of the second wedge ring and the first end of the first wedge ring are directly connected outside of the wedge-shaped end portion of the tubular composite rod.

2. The assembly of claim 1, wherein the connection is implemented by at least one of:

a thread, one or more fasteners, an adhesion, or a combination thereof.

3. The assembly of claim 1, wherein a cross-section of the tubular composite rod is at least one of:

circular, quadratic, rectangular, or polygonal.

4. The assembly of claim 1, wherein the third wedge ring is formed of two segments.

5. The assembly of claim 1, wherein the third wedge ring is formed of three segments.

6. The assembly of claim 1, wherein the first wedge ring has a slope $\alpha$ in an axial cross-section at the external surface of the first wedge ring and the third wedge ring has a slope $\beta$ in an axial cross-section at the external surface of the third wedge ring.

7. The assembly of claim 6, wherein the slope $\alpha$ is greater than the slope $\beta$.

8. The assembly of claim 6, wherein the slope $\alpha$ is smaller than the slope $\beta$.

9. The assembly of claim 1, wherein one of the first wedge ring, the second wedge ring or the third wedge ring are formed of at least one of:

a metal or a metal alloy.

10. The assembly of claim 1, wherein the tubular composite rod is formed as fiber-reinforced composite embedded in a matrix.

11. The assembly of claim 10, wherein a fiber of the fiber-reinforced composite includes at least one of carbon, glass, organic, or boron fibers, wherein the matrix includes at least one of a thermoset polymer or a thermoplastic polymer.

12. An aircraft seat, the aircraft seat comprising:

a seatback;

a seat pan; and a base assembly couplable to a floor of an aircraft cabin via one or more floor fittings, the base assembly comprising:

one or more tubular composite rods, wherein at least one end of the tubular composite rod has a wedge-shaped radially outward geometry to form a wedge-shaped end portion, wherein each tubular composite rod of the one or more tubular composite rods comprise:

one or more joint assemblies, each joint assembly comprising:

a first wedge ring, wherein the first wedge ring is arranged on an internal surface of the tubular composite rod at the wedge-shaped end portion of the tubular composite rod, wherein the first wedge ring is conical and asymmetric in an axial cross-section with the wedge-shaped end portion, wherein the first wedge ring includes a first end and a second end, wherein the first end of the first wedge ring has a first diameter and the second end of the first wedge ring has a second diameter, wherein the first diameter is greater than the second diameter, wherein a slope of the first wedge ring is complementary to a rod slope of the tubular composite rod;

a second wedge ring, wherein the second wedge ring is arranged radially outward of an external surface of the tubular composite rod at the wedge-shaped end portion of the tubular composite rod; and a third wedge ring, wherein the third wedge ring is arranged between the second wedge ring and the external surface of the tubular composite rod at the wedge-shaped end portion of the tubular composite rod, wherein the third wedge ring is formed of two or more segments placed in a hoop direction, wherein the second wedge ring includes a first end and a second end, wherein the first end of the second wedge ring and the first end of the first wedge ring are directly connected outside of the wedge-shaped end portion of the tubular composite rod.

13. The aircraft seat of claim 12, wherein the third wedge ring is formed of two segments.

14. The aircraft seat of claim 12, wherein the third wedge ring is formed of three segments.

15. The aircraft seat of claim 12, wherein the first wedge ring has a slope $\alpha$ in an axial cross-section at the external surface of the first wedge ring and the third wedge ring has a slope $\beta$ in an axial cross-section at the external surface of the third wedge ring.

16. The aircraft seat of claim 12, wherein one of the first wedge ring, the second wedge ring or the third wedge ring are formed of at least one of:

a metal or a metal alloy.

17. The aircraft seat of claim 12, wherein the one or more tubular composite rods are formed as a fiber-reinforced composite embedded in a matrix, wherein a fiber of the fiber-reinforced composite includes at least one of carbon, glass, organic, or boron fibers, wherein the matrix includes at least one of a thermoset polymer or a thermoplastic polymer.

18. A method of manufacturing a joint assembly for a tubular composite rod comprising:

positioning a second wedge ring axially toward a middle region of the tubular composite rod, wherein at least one end of the tubular composite rod has a wedge-shaped radially outward geometry to form a wedge-shaped end portion;

positioning two or more segments of a third wedge ring radially to form a ring assembly in the wedge-shaped end portion of the tubular composite rod;

translating the second wedge ring axially toward the two or more segments of the third wedge ring in the wedge-shaped end portion of the tubular composite rod;

positioning a first wedge ring axially toward an internal surface of the tubular composite rod in the wedge-shaped end portion of the tubular composite rod, wherein the first wedge ring is conical and asymmetric in an axial cross-section with the wedge-shaped end portion, wherein a slope of the first wedge ring is complementary to a rod slope of the tubular composite rod, wherein the first wedge ring includes a first end and a second end, wherein the first end of the first wedge ring has a first diameter and the second end of the first wedge ring has a second diameter, wherein the first diameter is greater than the second diameter; and assembling the joint assembly by directly connecting the first end of the first wedge ring and the first end of the second wedge ring outside of the wedge-shaped end portion of the tubular composite rod.

\* \* \* \* \*